(12) United States Patent
Gaudreau

(10) Patent No.: US 6,611,443 B2
(45) Date of Patent: Aug. 26, 2003

(54) HIGH VOLTAGE CONVERTER SYSTEM

(75) Inventor: Marcel Pierre Joseph Gaudreau, Lexington, MA (US)

(73) Assignee: Biversfied Technologies, Inc., Bedford, MA (US)

( * ) Notice: Subject to any disclaimer, the term of this patent is extended or adjusted under 35 U.S.C. 154(b) by 0 days.

(21) Appl. No.: 10/157,517

(22) Filed: May 29, 2002

(65) Prior Publication Data

US 2002/0181261 A1 Dec. 5, 2002

Related U.S. Application Data

(60) Provisional application No. 60/294,081, filed on May 29, 2001.

(51) Int. Cl.[7] .......................... H02M 7/00; H02M 7/217
(52) U.S. Cl. .......................... 363/125; 363/127; 363/54
(58) Field of Search .................. 363/125, 127, 363/131, 67, 132, 98, 16, 17, 54; 307/71, 66, 64, 65; 323/282, 289, 298, 293

(56) References Cited

U.S. PATENT DOCUMENTS

| | | | |
|---|---|---|---|
| 2,112,046 A | 3/1938 | Puller et al. ................ 171/119 |
| 2,730,667 A | 1/1956 | Uhlmann ........................ 321/2 |
| 3,127,550 A | 3/1964 | Gilbreath et al. ........... 318/331 |
| 3,500,172 A | 3/1970 | Eckstein, Jr. .................. 323/9 |
| 3,818,307 A | 6/1974 | Hamilton et al. ............. 321/11 |
| 4,274,043 A | * 6/1981 | Heitz ........................ 307/151 |
| 4,334,264 A | 6/1982 | Knudsen ...................... 363/51 |
| 4,370,607 A | 1/1983 | Dassonville ................ 323/271 |
| 4,471,420 A | 9/1984 | Seeger ........................ 363/54 |
| 4,544,978 A | 10/1985 | Podobinski .................... 361/4 |
| 4,594,634 A | 6/1986 | Schminke .................... 361/93 |
| 4,620,296 A | 10/1986 | Siemon ........................ 363/51 |
| 4,638,178 A | * 1/1987 | Kayser ........................ 307/49 |
| 4,648,018 A | 3/1987 | Neupauer .................... 363/35 |
| 4,672,519 A | 6/1987 | Liss ............................ 363/35 |
| 4,727,448 A | 2/1988 | Hanyuda et al. .............. 361/18 |
| 4,737,897 A | 4/1988 | Shipley et al. ................ 363/19 |
| 4,999,760 A | 3/1991 | Tietema ........................ 363/53 |
| 5,155,673 A | 10/1992 | Takahashi et al. ............. 363/54 |
| 5,272,612 A | * 12/1993 | Harada et al. ................. 363/37 |
| 5,365,145 A | * 11/1994 | Fields .......................... 307/66 |
| 5,444,610 A | 8/1995 | Gaudreau et al. ............. 363/54 |
| 5,646,833 A | 7/1997 | Gaudreau et al. ............. 363/54 |
| 5,701,241 A | 12/1997 | Döfnäs et al. ................ 363/35 |
| 5,905,646 A | 5/1999 | Crewson et al. ............ 363/132 |
| 5,969,514 A | 10/1999 | Merrill ........................ 323/283 |
| 6,144,567 A | 11/2000 | Asplund et al. ............... 363/37 |
| 6,246,598 B1 | 6/2001 | Tarter et al. ............. 363/56.01 |
| 6,275,396 B1 | * 8/2001 | Farrar .......................... 363/65 |
| 6,304,466 B1 | 10/2001 | Clem et al. ................... 363/41 |
| 6,452,815 B1 | * 9/2002 | Zhu et al. .................... 363/17 |

OTHER PUBLICATIONS

U.S. patent application Ser. No. 09/479,982, Gaudreau et al., filed Jan. 10, 2000.

* cited by examiner

*Primary Examiner*—Rajnikant B. Patel
(74) *Attorney, Agent, or Firm*—Iandiorio & Teska

(57) ABSTRACT

A high voltage converter system including a high voltage power line at a first voltage level, a step-down device connected to a second voltage level lower than the first voltage level, and a high voltage switch module including a plurality of voltage limited controllable switch elements including components to limit the voltage across each the voltage limiting controllable switch element to a predetermined voltage when each the voltage limiting controllable switch element is in an open state and to a zero voltage when each the voltage limiting controllable switch element is in a closed state. The voltage limiting controllable switch elements are typically connected in series between the power line and the step-down device. The high voltage down-converter system also includes a control system to selectively set the open state and the closed state of each the voltage limiting controllable switch elements to control the current through the step-down device.

34 Claims, 5 Drawing Sheets

HIGH VOLTAGE CONVERTER SYSTEM

RELATED APPLICATIONS

This application claims priority of U.S. Utility Application No. 09/479,982 filed Jan. 10, 2000; and Provisional Application No. 60/294,081 filed May 29, 2001. All of these applications are incorporated by reference herein.

FIELD OF THE INVENTION

This invention relates to a high voltage power distribution and collection system and more particularly to a high voltage converter system for distributing and collecting power to and from a set of isolated, geographically-scattered, or generally inaccessible loads and sources, interconnected by one or more high voltage power lines or cables.

BACKGROUND OF THE INVENTION

In typical signal-carrying cable installations, repeater stations are required at various intervals, typically ten or more miles apart, to restore and amplify attenuated and time-smeared signals. These repeater stations are electronic devices which require electric power to operate.

Operating power for repeater stations is typically supplied by conventional power supplies connected to a local power grid at each repeater station, but, if grid power is not available or the repeater station is not readily accessible, such as repeater stations distributed at various intervals along the length of an intercontinental undersea cable, power for these repeater stations, or any other power consuming electronic devices, must be supplied at the cable ends and transmitted through the cable itself to the repeater stations, typically by means of a high voltage conductor (high voltage line) incorporated in the cable.

In the generation, transmission, and distribution of conventional electrical power, power is transmitted over long distances at high AC voltages, with the voltage step-down for local use or distribution done by AC transformers. High DC transmission voltages are also used, with down-conversion to AC being done by elaborate regional terminal installations. Conventional, long-distance, AC transmission techniques can not be used with undersea cables and similar applications for a variety of reasons, such as the capacitance effects and interference with signals. In applications like the powering of undersea repeaters, the power is most efficiently transmitted as low-current, high voltage DC introduced at the accessible ends of the cable, even though this creates a difficult voltage down-conversion or limitation problem at each of the remote locations which use the transmitted power. For ordinary electronic circuitry, the transmitted power must be converted (or limited) to low voltage at each individual locality or site where it is to be used.

Unfortunately, the existing and historical methods used for down-converting high voltage DC power to low DC or AC voltage are not at all appropriate for low or moderate power applications, since these methods typically involve the use of large SCR or mercury vapor rectifier tube installations requiring constant attention, or (for very low power installations) the use of power-wasting dropping resistors. A self-contained, reliable, high voltage DC-to-low voltage DC (or HVDC to AC) power conversion device able to run unattended is needed.

Likewise where power is to be collected from inaccessible, geographically-scattered, low-voltage sources of power (such as windmills, tidal generators, solar cells, and the like), an AC- or DC-to-HVDC converter capable of stepping up the low voltage power to high voltage before placing it on the high voltage cable is necessary, and this converter must be able to run unattended.

Furthermore, in a situation where any given device might act as either a source or a sink of power depending on local load or generating conditions, a converter readily capable of operation as either a voltage-converting step-down device or "in reverse" as a voltage step-up device in response to the direction of power flow would be very desirable.

At modest high voltages (less than 1000 VDC) and at the few-watt to several-kilowatt power levels, the power conversion or power conditioning functions are readily accomplished by conventional switching-type power supplies commonly used to convert high voltage DC to low voltage DC (or high voltage DC to low voltage AC). These prior art techniques are, however, unavailable for high voltage service above 1000–3000 volts due to the voltage limitations of the opening and closing semiconductor switches (IGBTs) used as choppers or synchronous rectifiers. Obtaining the required voltage holdoff for high voltage operation by connecting two or more switches of lesser holdoff capability in series and then switching them on and off simultaneously is notoriously difficult to do, because it requires high stability in voltage division across the switching devices, and great accuracy in the timing of their operation. If the voltage divides unevenly, or if one switch lags even slightly, to where the entire voltage appears across that switch, damage to the switch occurs instantly. Once damaged, it does not recover. For this reason, series-connected stacks of semiconductor switch devices are notoriously subject to so-called "zipper" failure, wherein the collapse of one device can set off a progressive and catastrophic destruction of all the others in the stack.

Other prior art switches have similar limitations. Sustained, repetitive opening and closing cannot be done efficiently with high voltage closing switches, such as thyratrons, spark gaps, or SCRs, since these devices, once closed, lose control and have to be shut off by other means. Some of these prior art devices also have negative current-voltage characteristics, uncertain triggering delays, and unstable holdoff recovery characteristics, making a non-wasteful, controlled, and reliable switch operation with them extremely difficult to accomplish. Repetitive high voltage switching by vacuum tubes (hard tubes) can also be done, but the technique is wasteful and inefficient due to the low current-emitting capability of the cathodes, the filament power required, the power lost in anode dissipation, and the size, fragility, and relatively short life expectancy of the tubes. In short, in the prior art, it has not been possible to switch high voltage reliably enough above 1000–3000 volts DC to make suitable high voltage switching supplies for converting high DC voltages (3000–100,000 volts or more) to low voltage DC or AC.

In the absence of suitable supplies able to be connected independently and directly to the high voltage line, other means have been used to supply power to devices to be operated in geographically isolated and inaccessible locations. One typical prior art technique of providing power to operate remotely located repeater stations or electronic devices is to connect them in series along the cable, and then force the maximum DC current needed by any given remote device through the entire system. This is typically accomplished by connecting a high voltage DC supply of one polarity at one end of the cable and another high voltage supply of opposite polarity at the other end of the cable to establish a current flow, with current return taking place by conduction through the earth. These cable-feeding, main DC power supplies are connected this way to obtain the required current at only half the voltage stress on the cable insulation with respect to ground that would otherwise occur if power were being fed from only one end. The current is passed through all the repeater stations located on the cable. The result is a series configuration of repeater stations on the high voltage power line with the necessary operating voltage at each remote location being developed by the voltage drop obtained across the equivalent input resistance of each successive load (e.g., series-connected street-lights or Christmas tree lights are powered in exactly the same way).

While the series connection assures that for a given wire size and power supply voltage, all devices will have the same current available (since current in a series circuit is the same everywhere), this prior art technique causes all the voltage drops due to cable and the power supplies of each repeater station to add along the cable length. Where a number of separate repeaters are to be powered, and the intervening cable resistance voltage drops overcome, very high voltages may be required to force the maximum desired operating current through the entire series system. As a result, cable repeater systems are typically fed with 10,000-volt main DC power supplies of opposite polarity at either end of the cable, the high voltage being necessary to develop the necessary current, typically of the order of one ampere, through the resistance of the cable and the loads.

A consequence of this prior art design is that the main supply voltage starts out high at one polarity at the near end of the cable, falls through zero somewhere in the middle, and then continues to fall with respect to the near end (i.e. it then rises toward the full voltage of the opposite polarity power supply at the far end). Since each low voltage output is supplied relative to the main supply voltage at its location, each repeater station (with the possible exception of a repeater station that might happen to be at the exact electrical center of the series system) operates at an elevated positive or negative voltage with respect to ground. Therefore, each repeater station power supply must be isolated from ground with careful insulation, and any equipment connected to it must be similarly isolated, meaning that the insulation cannot be breached for repair or reconfigured where such a breach would bring the equipment inside in contact with grounded tools or (necessarily-grounded) seawater. Working on such equipment while it is running would be dangerous for obvious reasons: such work would have to be done "hot" with the worker and his tools electrically isolated from ground or from contact with sea water. It also follows that accidents, opens, or faults to ground at any given location would disable the entire system, again much as faults or opens will disable entire system, similar to strings of streetlights or Christmas-tree bulbs.

This prior art method for supplying power to remotely located repeater stations suffers from another disadvantage. If the amount of current needed at any one location is less than the line current (current which is perforce sized to accommodate the current drawn by the maximum load), then wasteful compensating resistors must be used to re-route the unneeded current at that location around the under-consuming load while still maintaining the correct voltage across it. Likewise, local compensating resistor adjustments must be made to counter the effects of load changes taking place elsewhere in the system. At constant line current the available power can be adjusted by changing the total system voltage drop, but this method of control requires careful attention to stability.

Another set of disadvantages arise from the typical behavior of electrical loads in series. For stability, the repeater stations must present a constant current load, or one that shares a common resistance-current characteristic. A repeater station that happened to have a more strongly positive resistance-current characteristic than the other repeater stations, for example, from a repeater station having a shorter time-constant for heating due to operating dissipations, that repeater station will monopolize power at that location, leading to possible thermal runaway and burnout. A repeater station with an incompatible negative resistance-current characteristic will produce local power starvation and may cause undesirable oscillations in the current drawn by the entire system.

Another disadvantage found in the prior art is that while collection of power from distributed low voltage power generating sources (or from a mixture of low voltage loads and sources), could in principle be done with all the varying sources and loads connected in series, the result would be an impractical, hard-to-control system subject to large voltage fluctuations and current oscillations.

SUMMARY OF THE INVENTION

It is therefore an object of this invention to provide an improved system for distributing and collecting power, especially suited for use with multiple, isolated, inaccessible loads or sources connected to a high voltage DC transmission line or cable, where individual DC-to-DC (or DC-to-AC) power converters are connected directly across the across high voltage supply lines, or between a high voltage line and ground.

It is a further object of this invention to provide such a high voltage converter system which efficiently provides regulated and isolated low voltage power to a plurality of remotely located repeater stations or other electronic devices on a high voltage power line.

It is a further object of this invention to provide such a high voltage converter system which eliminates the need to configure multiple repeater stations in series along the high voltage power line.

It is a further object of this invention to provide such a high voltage converter system which eliminates the need for power-wasting compensating circuits or devices.

It is a further object of this invention to provide such a high voltage converter system which reduces the power required to provide regulated and isolated power to multiple remotely located stations or electronic devices.

It is a further object of this invention to provide such a high voltage converter system which reduces the amount of insulation and isolation needed for the low voltage output side of power supplies used to power remotely located repeater stations or electronic devices on a high voltage power line, and for any equipment attached to these low voltage outputs.

It is a further object of this invention to provide such a high voltage converter system which can tolerate breaching of the low voltage containment or insulation provided for repeater station equipment in an undersea environment.

It is a further object of this invention to provide such a high voltage converter system in which remotely located repeater stations can be easily accessed and repaired without requiring elaborate precautions for personnel and equipment protection occasioned by the need to work on equipment "floating" at high voltage.

It is a further object of this invention to provide such a high voltage converter system in which remotely located repeater stations can be easily accessed and repaired, or can sustain damage, or can be removed from service without interrupting the power- and signal-carrying functions of the cable.

It is a further object of this invention to provide such a high voltage converter system which can regulate itself in response to local demands from the cable repeater, without requiring readjustment of all the other loads or load compensating circuits in a cable string.

It is a further object of this invention to provide such a high voltage converter system which eliminates a possible cause of thermal runaway and burnout in remotely located repeater stations.

This invention results from the realization that a truly robust high voltage converter system which supplies isolated and regulated low voltage power to remotely located repeater stations on a high voltage power line, such as an undersea cable, can be achieved, not by connecting the power supplies of repeater stations in series along the length of the high voltage power line, a scheme which wastes power and requires each repeater station to be carefully insulated and isolated, or by using dropping resistors at each location, which waste even more power, but instead by utilizing converters which feature a plurality of controllable high voltage opening and closing switches connected in series which function effectively and efficiently at high voltages above 1000 volts to draw power directly from (or replace on) the high voltage line at each remote or inaccessible location by periodically chopping or reversing the voltage applied to the primary winding of a step-down transformer; if power is being fed back onto the high voltage line, the chopping or voltage-reversing is done to the power applied to the transformer's low voltage winding, which is now used as a primary, and the power taken from the high voltage winding, now used as a secondary, is synchronously rectified by the series string (or strings) of high voltage switches, to yield high voltage DC power which can be placed back on the high voltage line.

This invention features a high voltage converter system comprising a high voltage power line at a first voltage level, a step-down device connected to a second voltage level lower than the first voltage level, a high voltage switching module including a plurality of controllable switch elements in which the voltage across each the controllable switch element is limited to a predetermined voltage when each the voltage limiting controllable switch element is in an open state and to a zero voltage when each the voltage limiting controllable switch element is in a closed state. In one example, the voltage limiting controllable switch elements are typically connected in series between the power line and the step-down device. The high voltage converter system also includes a control system to selectively set the open state and the closed state of each the voltage limiting controllable switch elements to control the current flowing through the step-down device in response to the potential difference between the first and second voltage levels.

In one embodiment, each the controllable switch element includes a controllable switch capable of both opening and closing, and a voltage limiting device connected in parallel with each controllable switch. In one example, the control system includes a control circuit configured to activate at least one gate drive to drive an isolation circuit to control a sequence of open and closed states of the controllable switch elements to control the flow of current through the step-down device. Typically, the voltage applied to the step down device is in the range of 1000 to 100,000 volts or more, depending on the number of switching elements connected in series.

In one example, there are at least two gate drives, at least two gate drive transformers, and at least two controllable switch elements. Ideally, the step-down device is a high voltage step-down transformer. In one example, the high voltage step-down transformer is connected to a conditioning circuit to provide low voltage DC output. The high voltage step-down transformer may be connected to a conditioning circuit to provide low voltage AC output. The conditioning circuit may include a rectifier and a filter. Typically, the low voltage AC or DC output is in the range of 0 to 1000 volts. In one design, the high voltage converter may include a repeater power supply station connected to the conditioning circuit. In other examples, a motor or other electrical or electronic load may be connected to the conditioning circuit.

In another embodiment of this invention, the high voltage converter system includes an auxiliary low voltage power supply which receives reduced voltage from the high voltage power line for providing initial and operating power to the control circuit, for charging a battery, and for providing power to a gate drive power supply. A resistance may be connected between the high voltage power line and the auxiliary low voltage power supply to reduce the voltage received by the auxiliary low voltage power supply. Ideally, the battery is charged by the low voltage DC output provided by the conditioning circuit. The system may also include means for detecting modulated control signals on the high voltage power line and means for demodulating the modulated signals to activate the control circuit to define the voltage applied to the step-down device. Typically, the first voltage level in the range of 1000 to 100,000 volts and the second voltage level is in the range of 0 to 1,000 volts, but may be any voltage needed by the connected equipment. In one preferred embodiment, the high voltage power line is a power-carrying conductor in an undersea cable. In one preferred design, the step-down device, the high voltage modulator, and the control system are oil immersed or epoxy encapsulated for isolation, cooling, pressure resistance.

In other designs, each the voltage limiting controllable switch element limits the voltage across each the voltage limiting controllable element circuit to a predetermined voltage when each the voltage limiting controllable switch circuit is in an open state and to zero voltage when each the voltage limiting controllable switch element is in a closed state.

In one embodiment the high voltage switch module is connected in a in reverse configuration to accept low voltage AC or DC power from an isolated, inaccessible sources, the module chopping or conditioning the low voltage AC or DC power as necessary to transform the power to high voltage AC power, the module further synchronously rectifying the power by utilizing of one or more sets of the voltage-limited switching and returning the high voltage AC power to the high voltage line. In one embodiment, the high voltage switch module is configured to automatically and dynamically responding to the direction of power flow on the high voltage power line by behaving as a step-down converter when the power flow is in a first direction and as a step-up converter when the power is flowing in a second direction opposite the first direction, the switch module thereby responding to changing local loads and changing outputs of power from local sources This invention further features a high voltage downconverter system comprising a plurality of stations interconnected between a high voltage power line at a first voltage level and a common voltage lower than the first voltage level. Each the station typically includes a step-down device connected to the common voltage, a high voltage switch module including a plurality of controllable switch elements in which voltage is limited across each the controllable switch element to a predetermined voltage when each the voltage limiting controllable switch circuit is in an open state and to a zero voltage when each the voltage limiting controllable switch element is in a closed state, the voltage limited controllable switch elements being connected in series between the power line and the step-down device, and a control system to selectively set the open state and the closed state of the voltage limiting controllable switch elements to control the passage of current through the step-down device.

In one embodiment, the common voltage may be ground. In one example, the common voltage is a second voltage power line at a voltage lower than the first voltage level, the second power line interconnecting each the station.

This invention further features a high voltage converter system for undersea cable repeater stations comprising a plurality of stations interconnected between a high voltage undersea power line at a first high voltage level and a common ground. Each the station ideally includes a step-down device connected to the common ground, a high voltage switching module including a plurality of controllable switch elements in which the voltage across each the controllable switch element is limited to a predetermined voltage when each the voltage limiting controllable switch element is in an open state and to a zero voltage when each the voltage limiting controllable switch element is in a closed state. In one example, the voltage limiting controllable switch elements may be connected in series between the power line and the step-down device. The high voltage converter system for undersea cable repeater stations further includes a control system to selectively set the open state and the closed state of each the voltage limiting controllable switch elements to control the current flowing through the step-down device in response to the potential difference between the first and second voltage levels, a conditioning circuit connected to the step-down device configured to output low voltage DC, and a repeater station connected to the conditioning device.

Ideally, the plurality of stations are oil immersed or epoxy encapsulated for isolation, cooling, and pressure resistance from undersea environment. In one embodiment, the high voltage undersea power line is at a voltage in the range of 1,000 to 100,000 or more volts. In one design, the low voltage DC is in the range of 0 to 1,000 volts or any voltage needed by the connected equipment.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
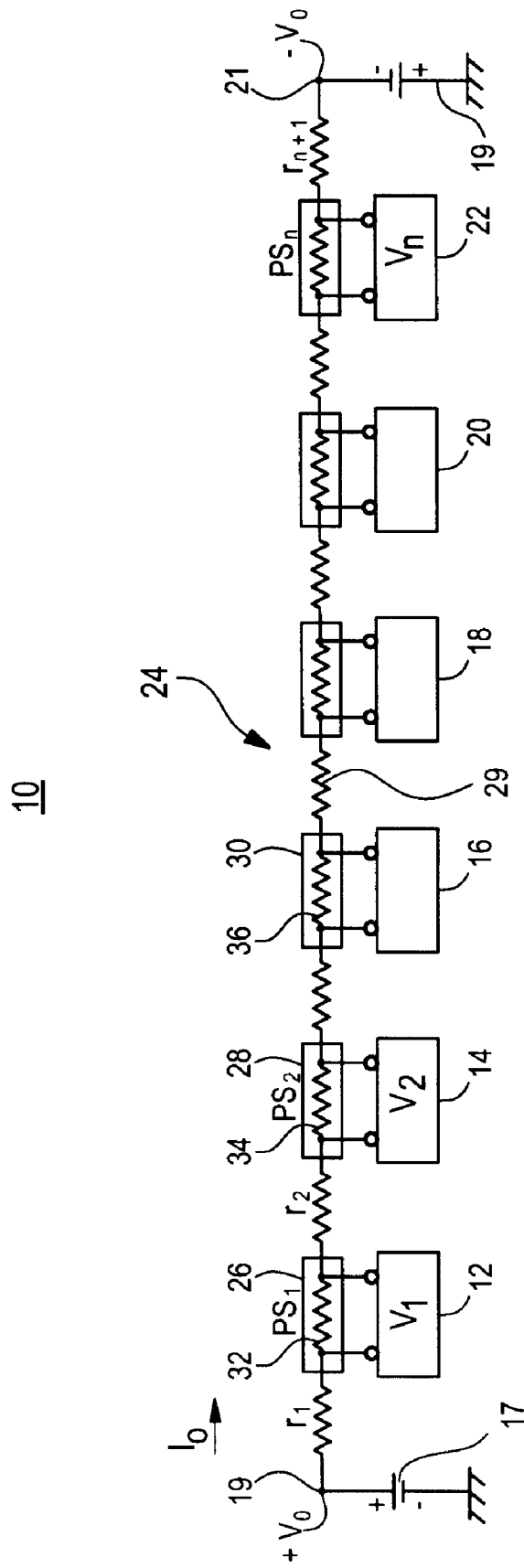
FIG. 1 is a diagram showing one prior art method of providing power to a remotely located repeated power supply station.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

As explained in the Background section above, typical prior art system 10, FIG. 1, provides power to remotely located repeater stations 12, 14, 16, 18, 20 and 22, located at intervals along a cable, typically in an inaccessible locations such as undersea. Power is supplied by establishing current flow through high voltage power line 24 by connecting high voltage power supply 17 of one polarity at end 19 of high voltage power at line 24 and high voltage power supply 19, of opposite polarity to power supply 17, at end 21. The individual, low-voltage power supplies for remotely located repeater stations 12–22 are typically spliced into high voltage power line 24 at the various repeater stations. For example, power supplies 26, 28, and 30 for repeater stations 12, 14, and 16, respectively, are spliced into high voltage power line 24. As can be seen from this prior art design, the necessary operating voltage at each remotely located repeater station 12, 14, and 16 is developed by the voltage drops obtained across equivalent input resistances 32, 34, and 36 of each successive power supply 26, 28, and 30. The total power to be supplied to the system consists of the sum of the wattages developed at each power supply and in each segment of cable resistance. Accordingly, since everything is connected in series, the voltage drops created from equivalent input resistances 32, 34, and 36 of power supplies 22, 24, and 26, respectively, and the voltage drops due to the resistance of the cable segments between them, each increase the potential difference (voltage) to be supplied by high voltage power supplies 17 and 19. Moreover, with this prior art design, the voltage level across high voltage line 24 varies significantly: from a very high positive voltage at end 19, falls steadily and monotonically to middle 29, turns negative at middle 29, and continues to fall to a maximum negative voltage at end 21, stressing the cable insulation at its extremities, and making it impossible in most locations to breach the cable or have it sustain damage without risk of a ground fault.

As shown above, and discussed in the Background section supra, this prior art design has several distinct disadvantages. First, the series connected configuration of each successive equivalent input resistance of each power supply of each remotely located repeater station increases the voltage to be supplied at the cable ends. For example, in a typical 2000 mile intercontinental undersea cable, there may be 100 or more repeater stations, each with an associated voltage drop, and a corresponding number of cable segments, also with a voltage drop. Since they are all in series, these drops add, thus significantly increasing the potential difference required to power the system. Second, because each individual repeater station operates with reference to the voltage of high voltage power line 24, each repeater station along high voltage power line 24 operates at an elevated positive or negative voltage level, requiring each repeater station to be isolated and carefully insulated. This design requires the use of extensive insulation and isolation of the repeater stations, with even greater isolation needed at the cable ends. The result in any undersea application is the inability to breach the repeater stations and the presence of ground at seawater, or repair the repeater stations, or any other electronic device with grounded tools because the equipment would also be exposed to elevated voltage levels.

As discussed in the Background section above, another prior art technique suitable for use with supply voltages of 1000 volts or less, is to convert the high voltage DC to low voltage DC or AC using switching-type power supplies. However, using this prior art technique, if DC conversion is required, such a conversion currently cannot be done at the very high DC supply voltages required to power a string of remotely located and inaccessible repeater stations, because forcing sufficient power to operate repeaters through thousands of miles of conductor of a reasonable diameter requires voltages simply too great to be switched with present day switching devices above 1000 volts.

Still other prior art designs use repetitive high voltage switching by SCRs, thyratrons, spark gaps, or vacuum tubes. However, as discussed above, these prior art designs waste power and are inefficient. Moreover, the use of gaseous or vacuum tubes in undersea environments is impractical. Vacuum tubes have been used in repeaters in, but these tubes have to be specially designed and run at reduced ratings to obtain long life, and have a significant risk for failure.

Figure 2:
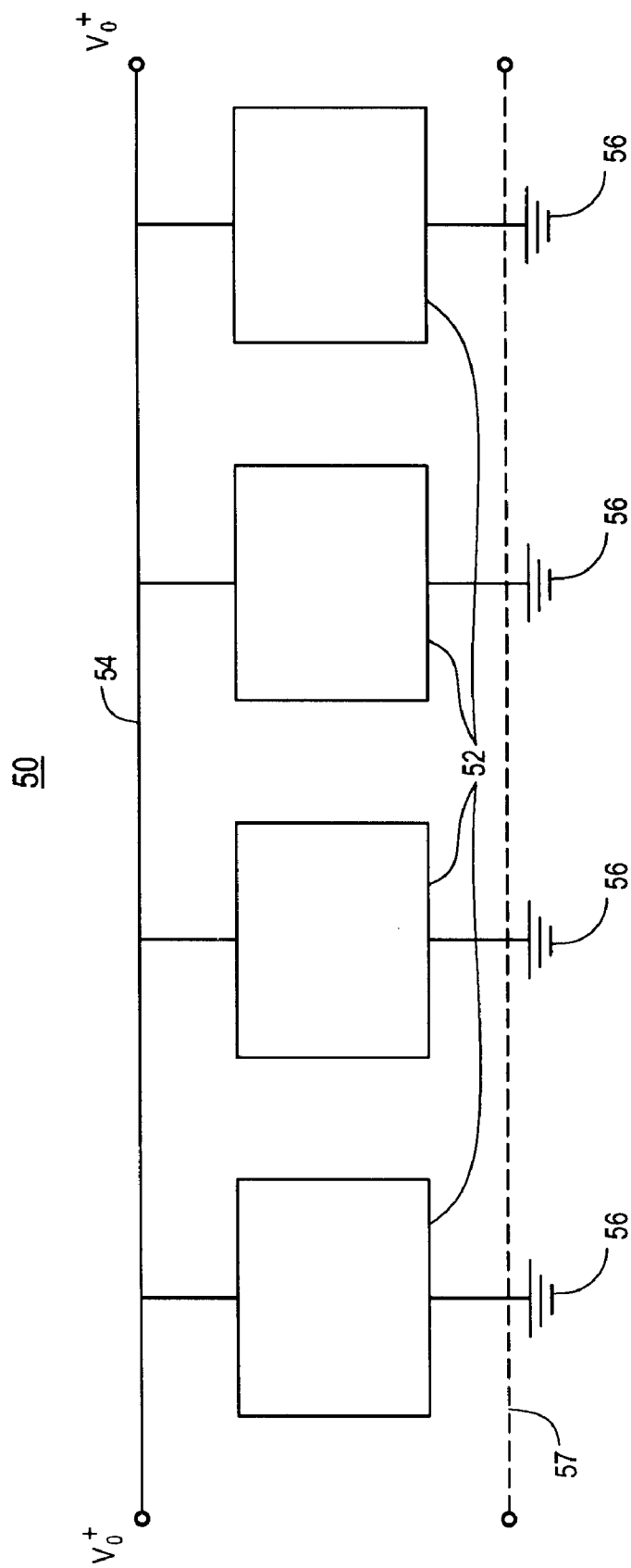
FIG. 2 is a block diagram of one embodiment of the high voltage converter system according to the present invention.

In contrast, high voltage converter system 50, FIG. 2 of the subject invention, in one embodiment, includes plurality of stations 52 interconnected between high voltage power line 54 at a first voltage level, typically in the range of 1,000–100,000 volts, and another voltage 56, lower than the first voltage level, typically 0 to 1000 volts. In one design, common voltage 56 may be ground, but alternatively, it may be the voltage on a second power line 57 (shown in phantom) interconnected between plurality of stations 52 (in which case the voltage will not actually be common, but will vary according to the voltage drops along the second power line). Each station 52 includes step down device 58, FIG. 3 connected, in one example, to common voltage 56, or alternatively, to any second voltage level lower than the first voltage level, such as 0 to 1000 volts. High voltage converter system 50 further includes high voltage switch module 60 including a plurality of voltage limited controllable switch elements 62, 64, and 66 with components for limiting the voltage across each switching element 62–66 to a predetermined voltage when each controllable switch element 62, 64, and 66 is in an open state and to a zero voltage when each controllable switch element 62, 64, and 66 is in a closed state. In one example, voltage limiting control switch elements 62–66 are connected in series between high voltage power line 54 and step down device 58. High voltage converter system 50 also includes control system 68 which sets the open state and closed state of switch element 62–66 to control the passage of current through the primary winding of step down device 58.

In one design of this invention, each voltage limiting controllable switch element 62, 64 and 66 includes controllable switch 70, 72, and 76, respectively, connected in parallel with voltage limiting devices 78, 80, and 82, respectively. Controllable switch 70 typically operates at voltages in the range of 1,000 to 100,000 volts. In one design, voltage limiting devices 78, 80, and 82 may be a zener diode, or any other voltage limiting device known to those skilled in the art.

High voltage switch module 60 typically operates at voltages in the range of 1,000 to 100,000 volts, but there is no individual-switching-element-determined upper limit to the voltage that may be switched.

Examples of high voltage switching module 60 and voltage limited controllable switch elements 62–66 as used in accordance with this invention to interrupt the current from high voltage line 54 are disclosed in co-pending application Ser. No. 09/472,982 filed Jan. 10, 2000 and U.S. Pat. Nos. 5,444,610 and 5,646,833, all incorporated herein in their entirety by this reference. The devices disclosed in the aforementioned application and patents employ stacked field effect transistors (FETs) or insulated gate bipolar transistors (IGBTs) as switches triggered simultaneously in the manner of the POWER-MOD® switch, and are capable of being triggered on or off to switch voltages determined by the number of switch elements in series. Switching may be obtained at any desired voltage, and is not limited to the 1000–3000 volts maximum holdoff obtainable with a single switching element.

In one embodiment of this invention, control system 68 includes control circuit 78 configured to define the voltage applied to step down device 58 by activating at least one gate drive 81 to drive isolation circuit 82 to control controllable switch elements 62–66 to control the current though step down device 58. Although in FIG. 3 one gate drive is shown, this is not a necessary limitation of this invention, as any number of gate drives may be used by those skilled in the art to drive isolation circuit 82. Step-down device 58 then efficiently and easily steps down the high voltage to a voltage level which can be easily conditioned to low voltage AC or DC by a conditioning circuit, such as conditioning circuit 98, and provides constant and reliable isolated low voltage power to the repeater stations, such as repeater station 100, or any other typical remotely located and inaccessible load.

Figure 4:
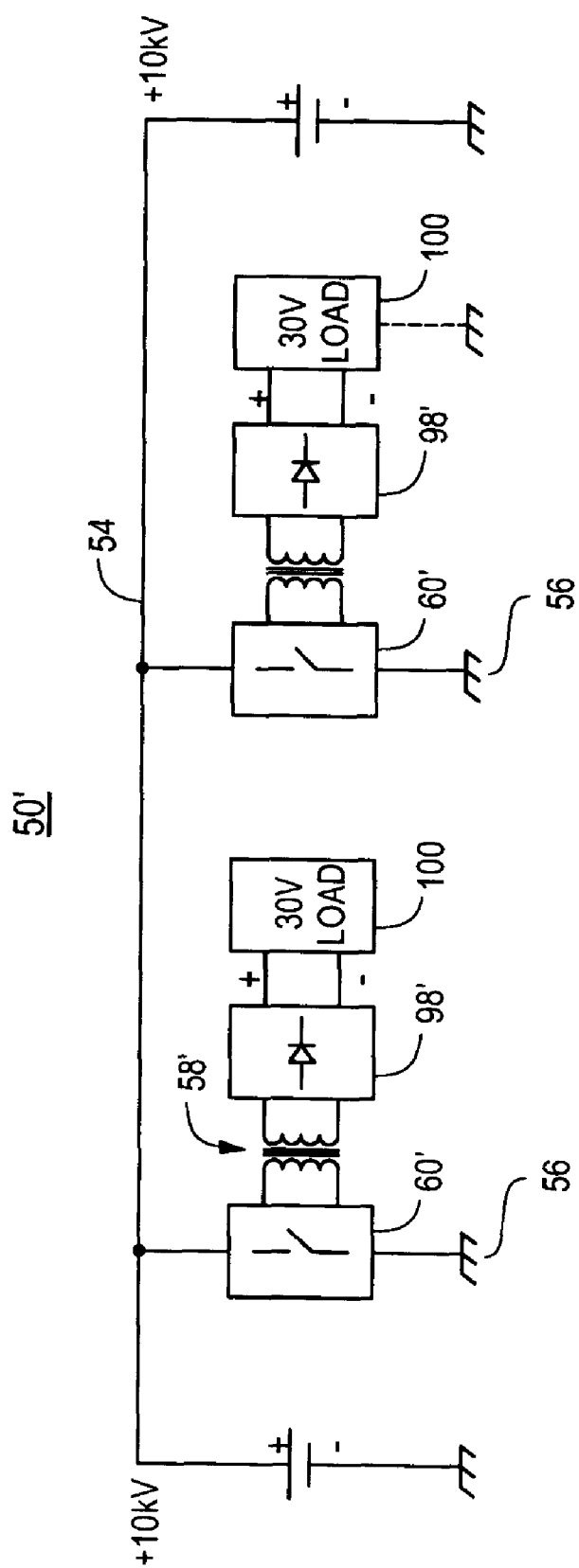
FIG. 4 is a schematic diagram of another embodiment of the high voltage converter system according to the present invention.

In other designs of this invention, high voltage converter system 50', FIG. 4 of the subject invention includes high voltage switch module 60', of similar design to high voltage switch module 60, interconnected between high voltage power line 54 and another voltage 56, lower than the first voltage level. System 50' further includes step-down device 58' interconnected between high voltage switch module 60' and conditioning circuit 98'. Repeater station 100 is typically connected to conditioning circuit 98'.

Figure 5:
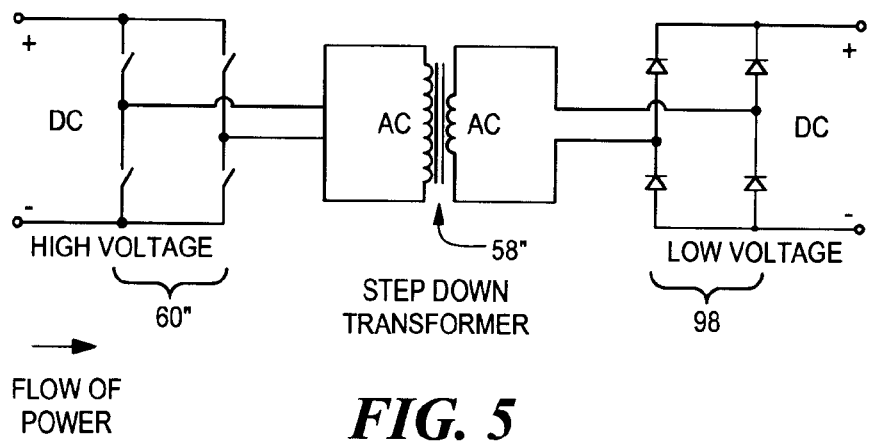
FIG. 5 is a schematic diagram showing one embodiment of high voltage converter system of the subject invention employing two switch modules configured as a single phase converter.
Figure 6:
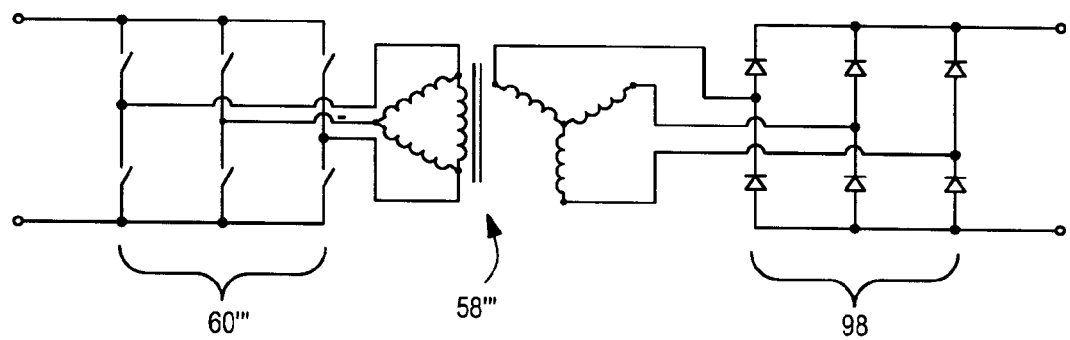
FIG. 6 is a schematic diagram showing one embodiment of high voltage converter system of the subject invention employing three switch modules configured as a three-phase converter.

FIG. 5 shows one embodiment of this invention as employed in a typical power supply in which two strings of high voltage switch module 60" are used to interrupt and reverse the current through single-phase step-down device 58". FIG. 6 depicts another design of this invention employing three strings of series high voltage switch module 60'" and step-down device 58'" as used for a typical three-phase device.

Figure 7:
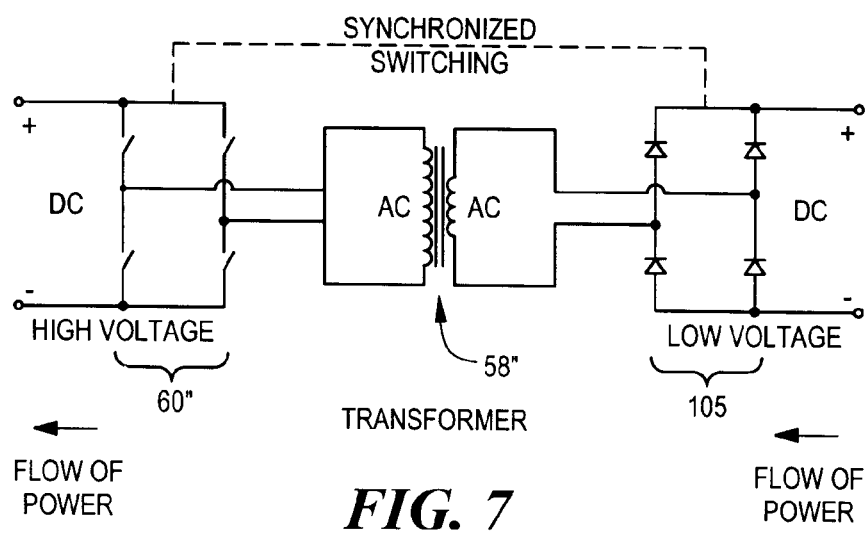
FIG. 7 is a schematic diagram showing one embodiment of high voltage converter system of the subject invention employing the switching module in reverse to convert low voltage power to high voltage DC and place it back on the line.

As discussed above, similar arrangements of transformers and switches can be used "in reverse", to accept power produced at low AC or DC voltages, by devices such as windmills, solar power installations, tidal engines, and the like, convert the power to high voltage DC, and place it back on the line, as shown in FIG. 7. Low AC voltage collected or returned from these devices can be transformed directly to high AC voltage by feeding it "backwards" through step-down device 58". The collected low voltage DC power can be chopped by a chopper 105 and transformed similarly to high voltage. The resulting high voltage AC can then be rectified to high voltage DC suitable for being placed back on the high voltage line. This can be done by driving the high voltage switch module 60", or a plurality of modules 60", in synchrony with the AC alternations, or in synchrony with the chopper 105, to provide so-called "synchronous rectification." Alternatively, the high voltage AC can be rectified by conventional high voltage diodes (not shown), temporarily switched into the circuit for this purpose.

Because high voltage converter system 50 is not connected in a series configuration with high voltage power line 54, and instead utilizes high voltage controllable switching and a step down transformer, the innovative design of the subject invention results in the ability to provide isolated low voltage DC power to remotely located repeater stations without having to splice the power supplies of repeater stations in series along a high voltage power line as found in the prior art. The result is a significant reduction in the overall voltage needed on the high voltage power line, elimination of power consuming compensating circuits and devices, and isolation of any devices connected to the step-down transformer (e.g., a repeater station, motor, or other device) from the high voltage power line. Isolated low voltage DC eliminates the need for extensive insulation and isolation of any device connected to the step-down device. This unique feature provides the ability to remotely breach located repeater stations on high voltage power lines, such as undersea cables, or to approach other isolated loads or power sources, and easily repair them with grounded tools and equipment, without risking ground fault of the high voltage line, or requiring that the whole system be shut down.

Moreover, because high voltage converter system 50, in accordance with this invention, reduces the voltage level required across the high voltage power line, the voltage level remains relatively constant throughout the entire length of high voltage power line 54. Accordingly, there is no need to extensively insulate devices located closest the ends of the high voltage power supplies. While it may still be appropriate to use a main power supply at either end of the cable in order to limit the amount of current to be carried by the cable, both supplies will be of the same polarity. The entire cable will be at that same polarity as well, with the voltage declining somewhat from the ends toward the middle of the span. Although the line current will increase toward the ends of the span, the currents drawn at high voltage in accordance with this invention are low, and the line can be designed so that the total current to be carried does not exceed the current carrying capacity of the line.

In one preferred example, there are at least two switch elements connected in series with their respective gate drives and voltage limiting circuitry, although this is not a necessary limitation of the subject invention, as any number of switching elements, gate drives, and voltage limiting controllable switch elements, e.g. five, ten, fifty, or more may be used by those skilled in the art to achieve the necessary voltage switching capability. Preferably, step down device 58 is a high voltage transformer. In one preferred design of this invention, conditioning circuit 98 is connected to step down device 58 to provide low voltage DC output. In one example, the conditioning circuit includes a rectifier and a filter (not shown). In another preferred design, the conditioning circuit provides a smoothed low voltage AC output, or converts the alternating current produced by the step down device to AC of a different frequency. The low voltage AC or DC output may be in the range of 0 to 1,000 volts, but may be any voltage needed by the connected equipment.

Figure 3:
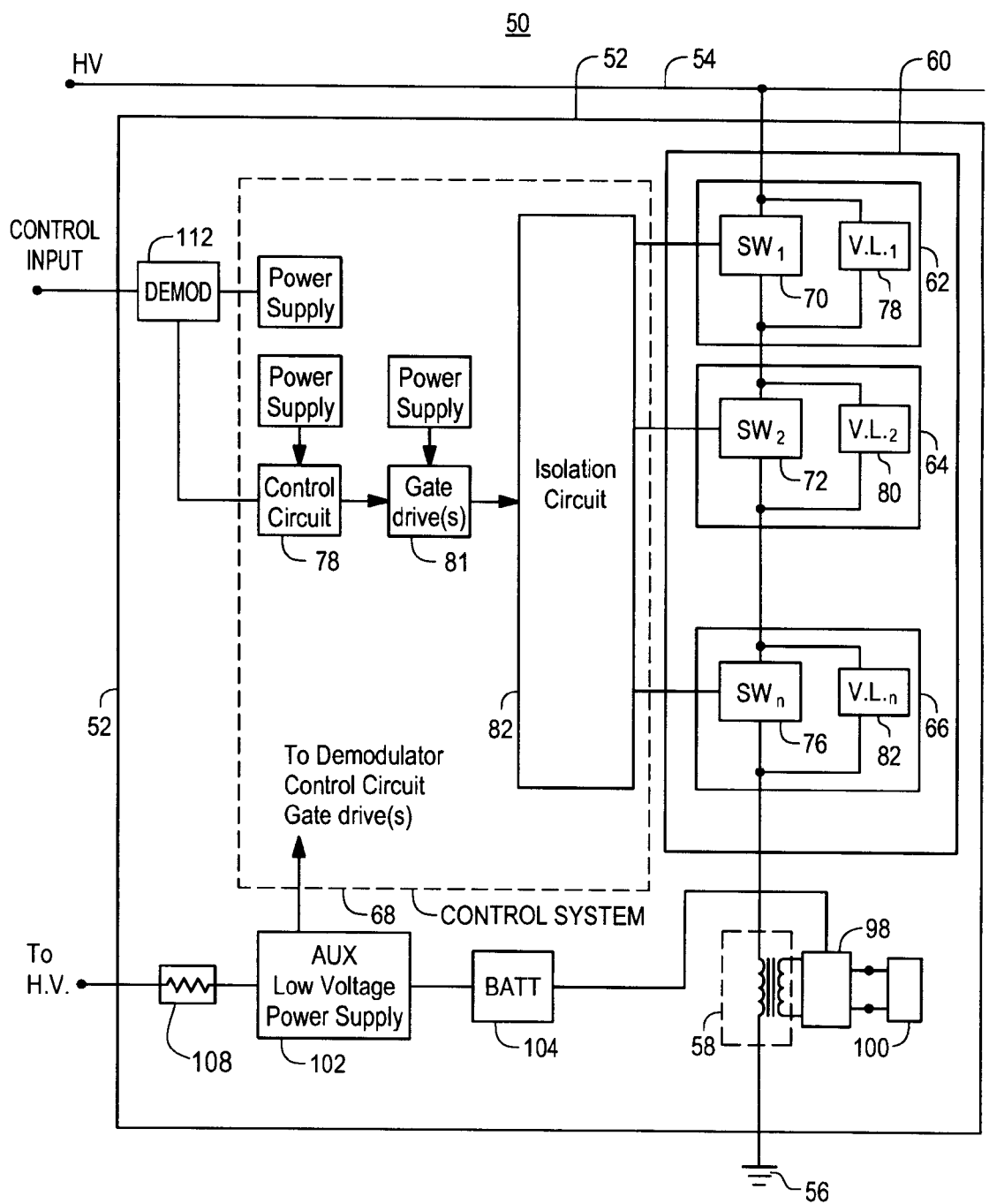
FIG. 3 is a block diagram of the various components associated with one station of the high voltage converter system shown in FIG. 2.

In a typical embodiment of the subject invention, repeater 100 as shown in FIGS. 3 and 4 is connected to conditioning circuit 98. In other examples in accordance with this invention, other electronic or electrical devices such as motors, transducers, and the like are connected to the conditioning circuit.

In order to start and operate, high voltage converter system 50, FIG. 3 ideally includes auxiliary low voltage power supply 102 which receives reduced voltage from high voltage power line 54 for providing initial and operating power to control circuit 78, or for charging a battery 104, and for providing initial power to gate drive power supply 106. In one design of this invention, resistance 108 is connected between high voltage power line 54 and auxiliary low voltage power supply 102. Battery 104 can also be charged by low voltage DC output provided by conditioning circuit 98, once system 50 is in operation. These and other ways of starting and operating the converter known to those skilled in the art.

In order to control the converter, in one embodiment of this invention, high voltage converter system 50 includes means 110 for detecting control signals on high voltage power line 54, or sent separately over the signal-carrying cable conductors (not shown), and means 112 for demodulating and decoding the modulated signals to activate control circuit 78 to control operation of the converter system 50. Means for transmitting, receiving, decoding, and activating circuitry and equipment are all well known prior art devices relating to the control and monitoring of remote or inaccessible electrical power transmission and communications equipment, mechanical equipment, and the like. In one example, the means for deactivating the modulated control signals may be a carrier signal pinch off device and means for demodulating the modulated signals include a carrier signal demodulator.

In a preferred embodiment in accordance with this invention, high voltage converter system 50 as shown in FIGS. 2–7 may be employed for use with undersea cable repeater stations, however other applications include any difficult-to-reach loads, such as propulsion motors for tethered remote-controlled undersea vehicles, robot submarines and the like.

As described above, by reversing the direction of the flow of power between high and low voltage winding of the voltage-changing device (transformer), the architecture of system 50 can be used to collect power generated by windmills, solar power installations, tidal engines, and the like.

Ideally, in one embodiment, the voltage-converting step-down or step up device 58, high voltage switch module 60 and control system 68 are oil immersed or epoxy encapsulated for isolation, cooling, and high pressure encountered in the under sea environment.

As shown above, the high voltage converter system of the subject invention provides constant, reliable, and isolated low voltage DC to repeater stations, or any other electric or electronic devices located in inaccessible remote locations, and it likewise can be used to collect power from remote windmills, solar power installations, tidal engines, and the like. There is no need to splice the power supplies of these devices in series along the high voltage power line. The robust design of the subject invention reduces the overall voltage required on a high voltage power line, eliminates power consuming compensating circuits and devices, eliminates the need for extensive insulation of the low voltage side of the converter and any equipment attached to it, and provides the ability to breach and easily repair any damaged low voltage equipment or components, or to remove them from the system without risk of ground fault of the high voltage line, or the need to shut down the entire system if one of these events occurs.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A high voltage converter system comprising:
   a high voltage power line at a first voltage level;
   a step-down device connected to a second voltage level lower than said first voltage level;
   a high voltage switching module including a plurality of controllable switch elements in which the voltage across each said controllable switch element is limited to a predetermined voltage when each said voltage limiting controllable switch element is in an open state and to a zero voltage when each said voltage limiting controllable switch element is in a closed state, said voltage limiting controllable switch elements being connected in series between said power line and said step-down device; and
   a control system to selectively set said open state and said closed state of each said voltage limiting controllable switch elements to control the current flowing through said step-down device in response to the potential difference between the first and second voltage levels.

2. The high voltage converter system of claim 1 in which each said controllable switch element includes a controllable switch capable of both opening and closing, and a voltage limiting device connected in parallel with each controllable switch.

3. The high voltage down-converter of claim 1 in which the control system includes a control circuit configured to activate at least one gate drive to drive an isolation circuit to control a sequence of open and closed states of said controllable switch elements to control the flow of current through the said step-down device.

4. The high voltage converter of claim 3 in which said voltage applied to said step down device is in the range of 1000 to 100,000 volts, depending on the number of switching elements connected in series.

5. The high voltage converter of claim 3 in which the control circuit activates a plurality of isolated gate drives to drive an isolation circuit to control said switching elements to set said open state and closed state of each said controllable switch element.

6. The high voltage down-converter of claim 5 in which there are at least two gate drives, at least two gate drive transformers, and at least two controllable switch elements.

7. The high voltage converter of claim 1 in which the step-down device is a high voltage step-down transformer.

8. The high voltage converter of claim 7 in which the high voltage step-down transformer is connected to a conditioning circuit to provide low voltage DC output.

9. The high voltage converter of claim 7 in which the high voltage step-down transformer is connected to a conditioning circuit to provide low voltage AC output.

10. The high voltage converter of claim 8 in which said conditioning circuit includes a filter.

11. The high voltage converter of claim 9 in which said conditioning circuit includes a filter.

12. The high voltage converter of claim 10 in which said low voltage AC or DC output is in the range of 0 to 1000 volts.

13. The high voltage converter of claim 8 further including a repeater power supply station connected to said conditioning circuit.

14. The high voltage converter of claim 8 further including a motor or other electrical or electronic load connected to said conditioning circuit.

15. The high voltage converter system of claim 8 further including an auxiliary low voltage power supply which receives reduced voltage from said high voltage power line for providing initial and operating power to said control circuit, for charging a battery, and for providing power to a gate drive power supply.

16. The high voltage converter of claim 9 further including a repeater power supply station connected to said conditioning circuit.

17. The high voltage converter of claim 9 further including a motor or other electrical or electronic load connected to said conditioning circuit.

18. The high voltage converter system of claim 9 further including an auxiliary low voltage power supply which receives reduced voltage from said high voltage power line for providing initial and operating power to said control circuit, for charging a battery, and for providing power to a gate drive power supply.

19. The high voltage converter system of claim 15 in which a resistance is connected between said high voltage power line and said auxiliary low voltage power supply to reduce the voltage received by said auxiliary low voltage power supply.

20. The high voltage converter system of claim 15 in which said battery is charged by said low voltage DC output provided by said conditioning circuit.

21. The high voltage converter system of claim 1 further including means for detecting modulated control signals on said high voltage power line and means for demodulating said modulated signals to activate said control circuit to define said voltage applied to said step-down device.

22. The high voltage converter system of claim 1 in which said first voltage level in the range of 1000 to 100,000 volts.

23. The high voltage converter system of claim 1 in which said second voltage level is in the range of 0 to 1,000 volts.

24. The high voltage converter system of claim 1 in which said high voltage power line is a power-carrying conductor in an undersea cable.

25. The high voltage converter system of claim 21 in which said step-down device, said high voltage modulator, and said control system are oil immersed or epoxy encapsulated for isolation, cooling, pressure resistance.

26. The high voltage converter system of claim 1 in which the high voltage switch module is connected in a in reverse configuration to accept low voltage AC or DC power from an isolated, inaccessible sources, said module chopping or conditioning said low voltage AC or DC power as necessary to transform said power to high voltage AC power, said module further synchronously rectifying said power by utilizing of one or more sets of said voltage-limited switching and returning said high voltage AC power to said high voltage line.

27. The high voltage converter system of claim 1 in which said high voltage switch module is configured to automatically and dynamically responding to the direction of power flow on said high voltage power line by performing as a step-down converter when said power flow is in a first direction and as a step-up converter when said power is flowing in a second direction opposite said first direction, said switch module thereby responding to changing local loads and changing outputs of power from local sources.

28. A high voltage down-converter system comprising:
a plurality of stations interconnected between a high voltage power line at a first voltage level and a common voltage lower than said first voltage level, each said station including:
  a step-down device connected to said common voltage;
  a high voltage switch module including a plurality of controllable switch elements in which the voltage is limited across each said controllable switch element to a predetermined voltage when each said voltage limiting controllable switch circuit is in an open state and to a zero voltage when each said voltage limiting controllable switch element is in a closed state, said voltage limited controllable switch elements being connected in series between said power line and said step-down device; and
  a control system to selectively set said open state and said closed state of said voltage limiting controllable switch elements to control the passage of current through said step-down device.

29. The high voltage converter system of claim 28 in which said common voltage is ground.

30. The high voltage converter system of claim 29 in which said common voltage is a second voltage power line at a voltage lower than said first voltage level, said second power line interconnecting each said station.

31. A high voltage converter system for undersea cable repeater stations comprising:
a plurality of stations interconnected between a high voltage undersea power line at a first high voltage level and a common ground, each said station including:
  a step-down device connected to said common ground;
  a high voltage switching module including a plurality of controllable switch elements in which the voltage across each said controllable switch element is limited to a predetermined voltage when each said voltage limiting controllable switch element is in an open state and to a zero voltage when each said voltage limiting controllable switch element is in a closed state, said voltage limiting controllable switch elements being connected in series between said power line and said step-down device, and
  a control system to selectively set said open state and said closed state of each said voltage limiting controllable switch elements to control the current flowing through said step-down device in response to the potential difference between the first and second voltage levels;
  a conditioning circuit connected to said step-down device configured to output low voltage DC; and
  a repeater station connected to said conditioning device.

32. The high voltage converter of claim 31 in which said plurality of stations are oil immersed or epoxy encapsulated for isolation, cooling, and pressure resistance from undersea environment.

33. The high voltage converter system of claim 31 in which the high voltage undersea power line is at a voltage in the range of 1,000 to 100,000 volts.

34. The high voltage converter system of claim 31 in which the low voltage DC is in the range of 0 to 1,000 volts.

* * * * *

UNITED STATES PATENT AND TRADEMARK OFFICE
CERTIFICATE OF CORRECTION

PATENT NO. : 6,611,443 B2
DATED : August 26, 2003
INVENTOR(S) : Marcel Pierre Joseph Gaudreau It is certified that error appears in the above-identified patent and that said Letters Patent is hereby corrected as shown below:

<u>Title page,</u>
Item [73], Assignee, "Biversfied Technologies, Inc." should read
-- Diversified Technologies, Inc. --

Signed and Sealed this

Eighteenth Day of November, 2003

JAMES E. ROGAN
*Director of the United States Patent and Trademark Office*